United States Patent [19]
Glover

[11] Patent Number: 6,101,229
[45] Date of Patent: Aug. 8, 2000

[54] DATA SYNCHRONIZATION METHOD AND CIRCUIT USING A TIMEOUT COUNTER

[75] Inventor: Kerry C. Glover, Wylie, Tex.

[73] Assignee: Texas Instruments Incorporated, Dallas, Tex.

[21] Appl. No.: 08/819,314

[22] Filed: Mar. 18, 1997

Related U.S. Application Data

[60] Provisional application No. 60/014,858, Apr. 4, 1996.

[51] Int. Cl.[7] ........................................... H04L 7/00
[52] U.S. Cl. ........................... 375/354; 375/365; 375/368; 375/369
[58] Field of Search ..................... 375/354, 365, 375/368, 369

[56] References Cited

U.S. PATENT DOCUMENTS

| | | | |
|---|---|---|---|
| 5,341,249 | 8/1994 | Abbott et al. | 360/46 |
| 5,692,021 | 11/1997 | Walker | 375/354 |
| 5,809,091 | 9/1998 | Barrow | 375/354 |
| 5,818,885 | 10/1998 | Kim | 375/354 |
| 5,943,328 | 8/1999 | Hosford | 370/331 |

OTHER PUBLICATIONS

Lyle J. Frederickson, "Viterbi Detection of Matched Spectral Null codes for PR4 Systems," *IEEE Transactions on Magnetics*, vol. 28, No. 5, Sep. 1992, pp. 2889–2891.

K. Chopra and D.D. Woods, "A Maximum Likelihood Peak Detecting Channel," *IEEE Transactions on Magnetics*, vol. 27, No. 6, Nov. 1991, pp. 4819–4821.

Arvind M. Patel, "A New Digital Signal Processing Channel for Data Storage Products," *IEEE Transactions on Magnetics*, vol. 27, No. 6, Nov. 1991, pp. 4579–4584.

Richard C. Schneider, "Sequence (Viterbi–Equivalent) Decoding," *IEEE Transactions on Magnetics*, vol. 24, No. 6, Nov. 1988, pp. 2539–2541.

J.D. Coker, R.L. Galbraith, G.J. Kerwin, J.W. Rae, P.A. Ziperovich, "Implementation of PRML in a Rigid Disk Drive," *IEEE Transactions on Magnetics*, vol. 27, No. 6, Nov. 1991, pp. 4538–4543.

H. Kobayashi and D.T. Tang, "Application of Partial–response Channel Coding to Magnetic Recording Systems," *IBM J. Res. Develop.*, Jul. 1970, pp. 368–375.

Kenneth Abend and Bruce D. Fritchman, "Statistical Detection for Communication Channels with Intersymbol Interference," *Proceedings of the IEEE*, vol. 58, No. 5, May 1970, pp. 779–785.

G. David Forney, Jr., "Maximum–Likelihood Sequence Estimation of Digital Sequences in the Presence of Intersymbol Interference," *IEEE Transactions on Information Theory*, vol. IT–18, No. 3, May 1972, pp. 363–378.

(List continued on next page.)

*Primary Examiner*—Stephen Chin
*Assistant Examiner*—Mohammad Ghayour
*Attorney, Agent, or Firm*—W. Daniel Swayze, Jr.; W. James Brady, III; Frederick J. Telecky, Jr.

[57] ABSTRACT

A data synchronization method and circuit are provided. A data synchronization circuit (28) includes a header timer (40), a timeout counter (44), a compare circuit (46), and a synchronization field register (48) for use in a read channel (10). During a read operation in the read channel (10), the data synchronization circuit (28) searches for the presence of a synchronization field in a read signal indicating that user data will be provided next. The search occurs over a predefined period of time. The header timer (40) enables a header timer signal for a first predefined period of time. The timeout counter (44) receives the header timer signal and enables a timeout counter signal for a second predefined period of time after the first predefined period of time expires. The compare circuit (46) compares the read signal to the known value or synchronization field stored in the synchronization field register (48). This comparison occurs during the second predefined period of time, the time in which the timeout counter signal is enabled to determine if a synchronization field is present in the read signal. Finally, the compare circuit (46) provides a synchronization detect signal that indicates whether a synchronization field was found during the second period of time.

16 Claims, 2 Drawing Sheets

OTHER PUBLICATIONS

G. David Forney, Jr. "The Viterbi Algorithm," *Proceedings of the IEEE,* vol. 61, No. 3, Mar. 1973, pp. 268–278.

Gottfried Ungerboeck, "Adaptive Maximum–Likelihood Receiver for Carrier–Modulated Data–Transmission Systems," *IEEE Transactions on Communications,* vol. Com–22, No. 5, May 1974, pp. 624–636.

Peter Kabal and Subbarayan Pasupathy, "Partial–Response Signaling," *IEEE Transactions on Communications,* vol. Com–23, No. 9, Sep. 1975, pp. 921–934.

C.T. Beare, "The Choice of the Desired Impulse Response in Combined Linear–Viterbi Algorithm Equalizers," *IEEE Transactions on Communications,* vol. Com–26, No. 8, Aug. 1978, pp. 1301–1307.

R.A. Baugh, E.S. Murdock, and B.R. Natarajan, "Measurement of Noise in Magnetic Media," *IEEE Transactions on Magnetics,* vol. MAG–19, No. 5, Sep. 1983, pp. 1722–1724.

Hans Burkhardt and Lineu C. Barbosa, "Contributions to the Application of the Viterbi Algorithm," *IEEE Transactions on Information Theory,* vol. IT–31, No. 5, Sep. 1985, pp. 626–634.

Yaw–Shing Tang, "Noise Autocorrelation in Magnetic Recording Systems," *IEEE Transactions on Magnetics,* vol. MAG–21, No. 5, Sep. 1985, pp. 1389–1394.

Roger W. Wood and David A. Petersen, "Viterbi Detection of Class IV Partial Response on a Magnetic Recording Channel," *IEEE Transactions on Communications,* vol. COM–34, No. 5, May. 1986, pp. 454–461.

Yaw–Shing Tang, "Noise Autocorrelation in High Density Recording on Metal Film Disks," *IEEE Transactions on Magnetics,* vol. MAG–22, No. 5, Sep. 1986, pp. 883–885.

C. Michael Melas, Patrick Arnett, Irene Beardsley, and Dean Palmer, "Nonlinear Superposition in Saturation Recording of Disk Media," *IEEE Transactions on Magnetics,* vol. MAG–23, No. 5, Sep. 1987, pp. 2079–2081.

Dean Palmer, Pablo Ziperovich, Roger Wood, and Thomas D. Howell, "Identification of Nonlinear Write Effects Using Pseudorandom Sequences," *IEEE Transactions on Magnetics,* vol. MAG–23, No. 5, Sep. 1987, pp. 2377–2379.

Roger Wood, "Jitter vs. Additive Noise in Magnetic Recording: Effects on Detection," *IEEE Transactions on Magnetics,* vol. MAG–23, No. 5, Sep. 1987, pp. 2683–2685.

H.K. Thapar and A.M. Patel, "A Class of Partial Response Systems for Increasing Storage Density in Magnetic Recording," *IEEE Transactions on Magnetics,* vol. MAG–23, No. 5, Sep. 1987, pp. 3666–3668.

Yinyi Lin and Jack K. Wolf, "Combined ECC/RLL Codes," *IEEE Transactions on Magnetics,* vol. 24, No. 6, Nov. 1988, pp. 2527–2529.

Catherine A. French, Anthony D. Weathers, and Jack Keil Wolf, "A Generalized Scheme for Generating and Detecting Recording Channel Output Waveforms with Controlled Pulse Polarity," *IEEE Transactions on Magnetics,* vol. 24, No. 6, Nov. 1988, pp. 2530–2532.

Richard C. Schneider, "Write Equalization for Generalized (d,k) Codes," *IEEE Transactions on Magnetics,* vol. 24, No. 6, Nov. 1988, pp. 2533–2535.

Michael Melas, Patrick Arnett, and Jaekyun Moon, "Noise in a Thin Metallic Medium: The Connection with Nonlinear Behaviour," *IEEE Transactions on Magnetics,* vol. 24, No. 6, Nov. 1988, pp. 2712–2714.

Jaekyun J. Moon and L. Richard Carley, "Partial Response Signaling in a Magnetic Recording Channel," *IEEE Transactions on Magnetics,* vol. 24, No. 6, Nov. 1988, pp. 2973–2975.

F. Dollvo, R. Hermann, and S. Olcer, "Performance and Sensitivity Analysis of Maximum–Likelihood Sequence Detection on Magnetic Recording Channels," *IEEE Transactions on Magnetics,* vol. 25, No. 5, Sep. 1989, pp. 4072–4074.

Roger Wood, "New Detector for 1,k Codes Equalized to Class II Partial Response," *IEEE Transactions on Magnetics,* vol. 25, No. 5, Sep. 1989, pp. 4075–4077.

J.W.M. Bergmans, S. Mita, and M. Izumita, "Characterization of Digital Recording Channels by Means of Echo Cancellation Techniques," *IEEE Transactions on Magnetics,* vol. 25, No. 5, Sep. 1989, pp. 4078–4080.

Yinyi Lin, "An Estimation Technique for Accurately Modelling the Magnetic Recording Channel Including Nonlinearities," *IEEE Transactions on Magnetics,* vol. 25, No. 5, Sep. 1989, pp. 4084–4086.

Anthony D. Weathers, Catherine A. French, and Jack Keil Wolf, "Results on 'Controlled Polarity' Modulation and Coding," *IEEE Transactions on Magnetics,* vol. 25, No. 5, Sep. 1989, pp. 4090–4092.

Catherine A. French, "Distance Preserving Run–Length Limited Codes," *IEEE Transactions on Magnetics,* vol. 25, No. 5, Sep. 1989, pp. 4093–4095.

Lyle J. Frederickson and Jack Keil Wolf, "Error Detecting Multiple Block (d,k) Codes," *IEEE Transactions on Magnetics,* vol. 25, No. 5, Sep. 1989, pp. 4096–4098.

Roger Wood, "Enhanced Decision Feedback Equalization," *IEEE Transactions on Magnetics,* vol. 26, No. 5, Sep. 1990, pp. 2178–2180.

Thomas D. Howell, Donald P. McCown, Thomas A. Diola, Yaw–shing Tang, Karl R. Hense, Ralph L. Gee, "Error Rate Performance of Experimental Gigabit Per Square Inch Recording Components," *IEEE Transactions on Magnetics,* vol. 26, No. 5, Sep. 1990, pp. 2298–2302.

Pantas Sutardja, "A Post–Compensation Scheme for Peak–Detect Channel," *IEEE Transactions on Magnetics,* vol. 26, No. 5, Sep. 1990, pp. 2303–2305.

L.L. Nunnelley, M.A. Burleson, L.L. Williams, and I.A. Beardsley, "Analysis of Asymmetric Deterministic Bitshift Errors in a Hard Disk File," *IEEE Transactions on Magnetics,* vol. 26, No. 5, Sep. 1990, pp. 2306–2308.

H.K. Thapar, N.P.Sands, W.L. Abbott, and J.M. Cioffi, "Spectral Shaping for Peak Detection Equalization," *IEEE Transactions on Magnetics,* vol. 26, No. 5, Sep. 1990, pp. 2309–2311.

Lyle J. Frederickson, "Coding for Maximum Likelihood Detection on a Magnetic Recording Channel," *IEEE Transactions on Magnetics,* vol. 26, No. 5, Sep. 1990, pp. 2315–2317.

Lyle J. Frederickson, "A (D,K,C)=(0,3,5/2) Rate 8/10 Modulation Code," *IEEE Transactions on Magnetics,* vol. 26, No. 5, Sep. 1990, pp. 2318–2320.

R. Hermann, "Volterra Modeling of Digital Magnetic Saturation Recording Channels," *IEEE Transactions on Magnetics,* vol. 26, No. 5, Sep. 1990, pp. 2125–2127.

Roger Wood, Mason Williams, and John Hong, "Considerations for High Data Rate Recording with Thin–Film Heads," *IEEE Transactions on Magnetics,* vol. 26, No. 6, Nov. 1990, pp. 2954–2959.

Jaekyun Moon and L. Richard Carley, "Performance Comparison of Detection Methods in Magnetic Recording," *IEEE Transactions on Magnetics,* vol. 26, No. 6, Nov. 1990, pp. 3155–3172.

William L. Abbott, John M. Cioffi, and Hemant K. Thapar, "Performance of Digital Magnetic Recording with Equalization and Offtrack Interference," *IEEE Transactions on Magnetics,* vol. 27, No. 1, Jan. 1991, pp. 705–716.

Jan W.M. Bergmans, Seiichi Mita, and Morishi Izumita, "A Simulation Study of Adaptive Reception Schemes for High–Density Digital Magnetic Storage," *IEEE Transactions on Magnetics,* vol. 27, No. 1, Jan. 1991, pp. 717–723.

Ching Tsang and Yaw–Shing Tang, "Time–Domain Study of Proximity–Effect Induced Transition Shifts," *IEEE Transactions on Magnetics,* vol. 27, No. 2, Mar. 1991, pp. 795–802.

K.B. Klaassen, "Magnetic Recording Channel Front–Ends," *IEEE Transactions on Magnetics,* vol. 27, No. 6, Nov. 1991, pp. 4503–4508.

John Hong, Roger Wood, David Chan, "An Experimental 180 Mb/sec PRML Channel for Magnetic Recording," *IEEE Transactions on Magnetics,* vol. 27, No. 6, Nov. 1991, pp. 4532–4537.

Jonathan D. Coker, Richard L. Galbraith, and Gregory J. Kerwin, "Magnetic Characterization using Elements of a PRML Channel," *IEEE Transactions on Magnetics,* vol. 27, No. 6, Nov. 1991, pp. 4544–4548.

L. Richard Carley and John G. Kenney, "Comparison of Computationally Efficient Forms of FDTS/DF Against PR4–ML," *IEEE Transactions on Magnetics,* vol. 27, No. 6, Nov. 1991, pp. 4567–4572.

Jaekyun Moon, "Discrete–Time Modeling of Transition–Noise Dominant Channels and Study of Detection Performance," *IEEE Transactions on Magnetics,* vol. 27, No. 6, Nov. 1991, pp. 4573–4578.

Jack Keil Wolf, "A Survey of Codes for Partial Response Channels," *IEEE Transactions on Magnetics,* vol. 27, No. 6, Nov. 1991, pp. 4585–4589.

Norman L. Koren, "Matched Filter Limits and Code Performance in Digital Magnetic Recording," *IEEE Transactions on Magnetics,* vol. 27, No. 6, Nov. 1991, pp. 4594–4599.

H.M. Hilden, D.G. Howe, and E.J. Weldon, Jr., "Shift Error Correcting Modulation Codes," *IEEE Transactions on Magnetics,* vol. 27, No. 6, Nov. 1991, pp. 4600–4605.

Derek D. Kumar and Bill J. Hunsinger, "ACT–enabled 100 MHz Channel Equalizer," *IEEE Transactions on Magnetics,* vol. 27, No. 6, Nov. 1991, pp. 4799–4803.

Alan J. Armstrong and Jack Keil Wolf, "Performance Evaluation of a New Coding Scheme for the Peak Detecting Magnetic Recording Channel," *IEEE Transactions on Magnetics,* vol. 27, No. 6, Nov. 1991, pp. 4804–4806.

S. Raghavan and H.K. Thapar, "Feed–Forward Timing Recovery for Digital Magnetic Recording," International Conference on Communications Conference Record, vol. 2, 1991, pp. 794–798.

S.A. Raghavan and H.K. Thapar, "On Feed–Forward and Feedback Timing Recovery for Digital Magnetic Recording Systems," *IEEE Transactions on Magnetics,* vol. 27, No. 6, Nov. 1991, pp. 4810–4812.

James Fitzpatrick and Jack Keil Wolf, "A Maximum Likelihood Detector for Nonlinear Magnetic Recording," *IEEE Transactions on Magnetics,* vol. 27, No. 6, Nov. 1991, pp. 4816–4818.

John J. Kenney, Peter Alexis McEwen, and L. Richard Carley, "Evaluation of Magnetic Recording Detection Schemes for Thin Film Media," *IEEE Transactions on Magnetics,* vol. 27, No. 6, Nov. 1991, pp. 4822–4824.

Pablo A. Ziperovich, "Performance Degradation of PRML Channels Due to Nonlinear Distortions," *IEEE Transactions on Magnetics,* vol. 27, No. 6, Nov. 1991, pp. 4825–4827.

Jaekyun Moon and Jian–Gang Zhu, "Nonlinear Effects of Transition Broadening," *IEEE Transactions on Magnetics,* vol. 27, No. 6, Nov. 1991, pp. 4831–4833.

Jaekyun Moon, "Signal–to–Noise Ratio Degradation with Channel Mismatch," *IEEE Transactions on Magnetics,* vol. 27, No. 6, Nov. 1991, pp. 4837–4839.

R.D. Barndt, A.J. Armstrong, H.N. Bertram, and J.K. Wolf, "A Simple Statistical Model of Partial Erasure in Thin Film Disk Recording Systems," *IEEE Transactions on Magnetics,* vol. 27, No. 6, Nov. 1991, pp. 4978–4980.

Y. Tang and C. Tsang, "A Technique for Measuring Nonlinear Bit Shift," *IEEE Transactions on Magnetics,* vol. 27, No. 6, Nov. 1991, pp. 5316–5318.

R.D. Barndt and J.K. Wolf, "Modeling and Signal Processing for the Nonlinear Thin Film Recording Channel," *IEEE Transactions on Magnetics,* vol. 28, No. 5, Sep. 1992, pp. 2710–2712.

H. Thapar, J. Rae, C. Shung, R. Karabed, and P. Siegel, "On the Performance of a Rate 8/10 Matched Spectral Null Code for Class–4 Partial Response," *IEEE Transactions on Magnetics,* vol. 28, No. 5, Sep. 1992, p. 2883–2888.

Hamid Shafiee and Jaekyun Moon, "Low–Complexity Viterbi Detection for a Family of Partial Response Systems†," *IEEE Transactions on Magnetics,* vol. 28, No. 5, Sep. 1992, pp. 2892–2894.

Weining Zeng and Jaekyun Moon, "Modified Viterbi Algorithm for a Jitter–dominant $1-D^2$ Channel," *IEEE Transactions on Magnetics,* vol. 28, No. 5, Sep. 1992, pp. 2895–2897.

William E. Ryan, "Comparative Performance Between Drop–Out Detection and Viterbi Reliability Metric Erasure Flagging," *IEEE Transactions on Magnetics,* vol. 28, No. 5, Sep. 1992, pp. 2898–2900.

C. Menyennett, L. Botha, and H.C. Ferreira, "A NewRunlength Limited Code for Binary Asymmetric Channels," *IEEE Transactions on Magnetics,* vol. 28, No. 5, Sep. 1992, pp. 2901–2903.

Gang H. Lin, Rick Barndt, H. Neal Bertram, and Jack K. Wolf, "Experimental Studies of Nonlinearities in High Density Disk Recording," *IEEE Transactions on Magnetics,* vol. 28, No. 5, Sep. 1992, pp. 3279–3281.

Ralph Simmons and Robert Davidson, "Media Design for User Density of up to 3 Bits per Pulse Width," *IEEE Transactions on Magnetics,* vol. 29, No. 1, Jan. 1993, pp. 169–176.

Jaekyun Moon and Jian–Gang Zhu, "Nonlinearities in Thin–Film Media and Their Impact on Data Recovery," *IEEE Transactions on Magnetics,* vol. 29, No. 1, Jan. 1993, pp. 177–182.

R.D. Barndt, A.J. Armstrong, and J.K. Wolf, "Media Selection for High Density Recording Channels," *IEEE Transactions on Magnetics,* vol. 29, No. 1, Jan. 1993, pp. 183–188.

Dean C. Palmer and Jonathan D. Coker, "Media Design Considerations for PRML Channel," *IEEE Transactions on Magnetics,* vol. 29, No. 1, Jan. 1993, pp. 189–194.

Zadian Software, Inc., *Disk Drive Technology,* Copyright 1990, San Jose, CA.

United States Patent Application for "System and Method for Reconstructing a Signal Wave in a Partial Response Read Channel," 32 pages of text and 8 figures. (Serial number and filing date is unknown.).

Roy D. Cideciyan, Francois Dolivo, Reto Hermann, Walter Hirt, and Wolfgang Schott, "A PRML System for Digital Magnetic Recording," *IEEE Journal on Selected Areas in Communications,* vol. 10, No. 1, Jan. 1992, pp. 38–56.

Thapar, et al., "A Class of Partial Response Systems for Increasing Storage Density in Magnetic Recording", *IEEE Transactions on Magnetics,* vol. MAG–23, No. 5, Sep. 1987, pp. 3666–3668.

Fredrickson, Lyle J., "A (D.K.C.)=(0.3, 5/2) Rate 8/10 Modulation Code", IEEE Transactions on Magnetics, vol. 26, No. 5, Sep. 1990, pp. 2318–2320.

French, et al., "A Generalized Scheme for Generating and Detecting Recording Channel Output Waveforms with Controlled Pulse Polarity", IEEE Transactions on Magnetics, vol. 24, No. 6, pp. 2530–2532.

Fitzpatrick, et al., "A Maximum Likelihood Detector for Nonlinear Magnetic Recording", IEEE Transactions on Magnetics, vol. 27, No. 6, Nov. 1991, pp. 4816–4818.

Chopra, et al., "A Maximum Likelihood Peak Detecting Channel", IEEE Transactions on Magnetics, vol. 27, No. 6, Nov. 1991, pp. 4819–4821.

Patel, Arvind M., "A New Digital Signal Processing Channel for Data Storage Products", IEEE Transactions on Magnetics, vol. 27, No. 6, Nov. 1991, pp. 4579–4584.

Menyennett, et al., "A New Runlength Limited Code for Binary Asymmetric Channels", IEEE Transactions on Magnetics, vol. 28, No. 5, Sep. 1992, pp. 2901–2903.

Lin, et al., "Experimental Studies of Nonlinearities in High DensityDisk Recording", IEEE Transactions on Magnetics, vol. 28, No. 5, Sep. 1992, pp. 3279–3281.

Sutardja, Pantan, "A Post–Compensation Scheme for Peak–detect Channel", IEEE Transactions on Magnetics, vol. 26, No. 5, Sep. 1990, pp. 2303–2305.

Barndt et al., "A Simple Statistical Model of Partial Erasure in Thin Film Disk Recording Systems", IEEE Transactions on Magnetics, vol. 27, No. 6, Nov. 1991, pp. 4978–4980.

Bergmans, et al., "A Simulation Study of Adaptive Reception Schemes for High–Density Digital Magnetic Storage", IEEE Transactions on Magnetics, vol. 27, No. 1, Jan. 1991, pp. 717–723.

Wolf, Jack Keil, "A survey of Codes for Partial Response Channels", IEEE Transactions on Magnetics, vol. 27, No. 6, Nov. 1991, pp. 4585–4589.

Tang, et al., "A Technique for Measuring Nonlinear Bit Shift", IEEE Transactions on Magnetics, vol. 27, No. 6, Nov. 1991, pp. 5316–5318.

Kumar, et al., "ACT–enabled 100MHz Channel Equalizere", IEEE Transactions on Magnetics, vol. 27, No. 6, Nov. 1991, pp. 4799–4803.

Ungerboeck, Gottfried, "Adaptive Maximum–Likelihood Receiver for Carrier–Modulated Data–Transmission Systems", IEEE Transactions on Communications, vol. COM–22, No. 5, May, 1974, pp. 624–636.

Lin, et al., "An Estimation Technique for Accurately Modelling the Magnetic Recording Channel Including Nonlinearities", IEEE Transactions on Magnetics, vol. 25, No. 5, Sep. 1989, pp. 4084–4086.

Hong, et al., "An Experimental 180 Mb/sec PRML Channel for Magnetic Recording", IEEE Transactions on Magnetics, vol. 27, No. 6, Nov. 1991, pp. 4532–4537.

Nunnelley, et al., "Analysis of Asymmetric Deterministic Bitshift Errors in a Hard Disk File", IEEE Transactions on Magnetics, vol. 26, No. 5, Sep. 1990, pp. 2306–2308.

Kobayashi, et al., "Application of Partial–response Channel Coding to Magnetic Recording Systems", IBM J. Res. Develop., Jul. 1970, pp. 368–375.

Bergmans, et al., "Characterization of Digital Recording Channels by Means of Echo Cancellation Techniques", IEEE Transactions on Magnetics, vol. 25, No. 5, Sep. 1989, pp. 4078–4080.

Frederickson, Lyle J., "Coding for Maximum Likelihood Detection on a Magnetic Recording Channel", IEEE Transactions on Magnetics, vol. 26, No. 5, Sep. 1990, pp. 2315–2317.

Lin, et al., "Combined ECC/RLL Codes", IEEE Transactions on Magnetics, vol. 24, No. 6, Nov. 1988, pp. 2527–2529.

Ryan, William E., "Comparative Performance Between Drop–Out Detection and Viterbi Reliability Metric Erasure Flagging", IEEE Transactions on Magnetics, vol. 28, No. 5, Sep. 1992, pp. 2898–2900.

Carley, et al., "Comparison of Computationally Efficient Forms of FDTS/DF Against PR4–ML", IEEE Transactions on Magnetics, vol. 27, No. 6, Nov. 1991, pp. 4567–4572.

Wood, et al., "Considerations for High Data Rate Recording with Thin–Film Heads", IEEE Transactions on Magnetics, vol. 26, No. 6, Nov. 1990, pp. 2954–2959.

Burkhardt, et al., "Contributions to the Application of the Viterbi Algorithm", IEEE Transactions on Information Theory, vol. IT–31, No. 5, Sep. 1985, pp. 626–634.

Moon, Jackyun, "Discrete–Time Modeling of Transition–Noise, Dominant Channels and Study of Detection Performance", IEEE Transactions on Magnetics, vol. 27, No. 6, Nov. 1991, pp. 4573–4578.

French, Catherine A., "Distance Preserving Run–Length Limited Codes", IEEE Transactions on Magnetics, vol. 25, No. 5, Sep. 1989, pp. 4093–4095.

Wood, Roger, "Enhanced Decision Feedback Equalization", IEEE Transactions on Magnetics, vol. 26, No. 5, Sep. 1990, pp. 2178–2180.

Frederickson, et al., "Error Detecting Multiple Block (d,k) Codes", IEEE Transactions on Magnetics, vol. 25, No. 5, Sep. 1989, pp. 4096–4098.

Howell, et al., "Error Rate Performance of Experimental Gigabit Per Square Inch Recording Compnents", IEEE Transactions on Magnetics, vol. 26, No. 5, Sep. 1990, pp. 2298–2302.

Kenney, et al., "Evaluation of Magnetic Recording Detection Schemes for Thin Film Media", IEEE Transactions on Magnetics, vol. 27, No. 6, Nov. 1991, pp. 4822–4824.

Ziperovich, Pablo A., "Performance Degradation of PRML Channels Due to Nonlinear Distortions", IEEE Transactions on Magnetics, vol. 27, No. 6, Nov. 1991, pp. 4825–4827.

Raghavan, et al., "Feed–Forward Timing Recovery for Digital Magnetic Recording", International Conference on Communications Conference Record, vol. 2, 1991, pp. 794–798.

Palmer, et al., "Identification of Nonlinear Write Effects Using Pseudorandom Sequences", IEEE Transactions on Magnetics, vol. MAG–23, No. 5, Sep. 1987, pp. 2377–2379.

Coker, et al., "Implementation of PRML in a Rigid Disk Drive", IEEE Transactions on Magnetics, vol. 27, No. 6, Nov. 1991, pp. 4538–4543.

Wood, Roger, "Jitter Vs. Additive Noise in Magnetic Recording Effects on Detection", IEEE Transactions on Magnetics, vol. MAG–23, No. 5, Sep. 1987, pp. 2683–2685.

Shafiee, et al., "Low–Complexity Viterbi Detection for a Family of Partial Response Systems", IEEE Transactions on Magnetics, vol. 28, No. 5, Sep. 1992, pp. 2892–2894.

Coker, et al., "Magnetic Characterization Using Elements of a PRML Channel", IEEE Transactions on Magnetics, vol. 27, No. 6, Nov. 1991, pp. 4544–4548.

Klaassen, K.B., "Magnetic Recording Channel Front–Ends", IEEE Transactions on Magnetics, vol. 27, No. 6, Nov. 1991, pp. 4503–4508.

Koren, Normal L., "Matched Filter Limits and Code Performance in Digital Magnetic Recording", IEEE Transactions on Magnetics, vol. 27, No. 6, Nov. 1991, pp. 4595–4599.

Forney, G. David, "Maximum–Likelihood Sequence Estimation of Digital Sequences in the Presence of Intersymbol Interference", IEEE Transactions on Information Theory, vol. IT–18, No. 3, May 1972, pp. 363–378.

Baugh, et al., "Measurement of Noise in Magnetic Media", *IEEE Transactions on Magnetics,* vol. MAG–19, No. 5, Sep. 1983, pp. 1722–1724.

Palmer, et al., "Media Design Considerations for a PRML Channel", *IEEE Transactions on Magnetics,* vol. 29, No. 1, Jan. 1993, pp. 189–194.

Simmons, et al., "Media Design for User Density of Up to 3 Bits Per Pulse Width", *IEEE Transactions on Magnetics,* vol. 29, No. 1, Jan. 1993, pp. 169–176.

Barndt, et al., "Media Selection for High Density Recording Channels", *IEEE Transactions on Magnetics,* vol. 29, No. 1, Jan. 1993, pp. 183–188.

Barndt, et al., "Modeling and Signal Processing for the Nonlinear Thin Film Recording Channel", *IEEE Transactions on Magnetics,* vol. 28, No. 5, Sep. 1992, pp. 2710–2712.

Zeng, et al., "Modified Viterbi Algorithm for a Jitter–dominant $1-D^2$ Channel", *IEEE Transactions on Magnetics,* vol. 28, No. 5, Sep. 1992, pp. 2895–8297.

Wood, Roger, "New Detector for 1.k Codes Equalized to Class II Partial Response", *IEEE Transactions on Magnetics,* vol. 25, No. 5, Sep. 1989, pp. 4075–4077.

Tang, Yaw–Shing, "Noise Autocorrelation in High Density Recording on Metal Film Disks", *IEEE Transactions on Magnetics,* vol. MAG–22, No. 5, Sep. 1986, pp. 883–885.

Tang, Yaw–Shing, "Noise Autocorrelation in Magnetic Recording Systems", *IEEE Transactions on Magnetics,* vol. MAG–21, No. 5, Sep. 1985, pp. 1389–1394.

Melas, et al., "Noise in a Thin Metallic Medium: The connection with Nonlinear Behaviour", *IEEE Transactions on Magnetics,* vol. 24, No. 6, Nov. 1988, pp. 2712–2714.

Moon, et al., "Nonlinear Effects of Transition Broadening", *IEEE Transactions on Magnetics,* vol. 27, No. 6, Nov. 1991, pp. 4831–4833.

Melas, et al., "Nonlinear Superposition in Saturation Recording of Disk Media", *IEEE Transactions on Magnetics,* vol. MAG–23, No. 5, Sep. 1987, pp. 2079–2081.

Moon, et al., "Nonlinearities in Thin–Film Media and Their Impact on Data Recovery", *IEEE Transactions on Magnetics,* vol. 29, No. 1, Jan. 1993, pp. 177–182.

Raghaven, et al., "On Feed–Forward and Feedback TimingRecovery for Digital Magnetic Recording Systems", *IEEE Transactions On Magnetics,* vol. 27, No. 6, Nov. 1991, pp. 4810–4812.

Thapar, et al., "On the Performance of a Rate 8/10 Matched Spectral Null Code for Class–4 Partial Response", *IEEE Transactions On Magnetics,* vol. 28, No. 5, Sep. 1991, pp. 2883–2888.

Kabal, et al., "Partial–Response Signaling", *IEEE Transactions on Communications,* vol. COM–23, No. 9, Sep. 1975, pp. 921–934.

Moon, et al., "Partial Response Signaling in a Magnetic Recording Channel", *IEEE Transactions on Magnetics,* vol. 24, No. 6, Nov. 1988, pp. 2973–2975.

Moon, et al., "Performance Comparison of Detection Methods for Magnetic Recording", *IEEE Transactions on Magnetics,* vol. 26, No. 6, Nov. 1990, pp. 3135–313172.

Dolivo, et al., "Performance and Sensitivity Analysis of Maximum–Likelihood Sequence Detection on Magnetic Recording Channels", *IEEE Transactions on Magnetics,* vol.25, No. 5, Sep. 1989, pp. 4072–4074.

Armstrong, et al., "Performance Evaluation of a New coding Scheme for the Peak Detecting Magnetic Recording Channel", *IEEE Transactions on Magnetics,* vol. 27, No. 6, Nov. 1991, pp. 4804–4806.

Abbott, et al., "Performance of Digital Magnetic Recording with Equalization and Offtrack Interference", *IEEE Transactions on Magnetics,* vol. 27, No. 1, Jan. 1991, pp. 705–716.

Weathers, et al., "Results on "Controlled Polarity" Modulation and Coding", *IEEE Transactions on Magnetics,* vol. 25, No. 5, Sep. 1989, pp. 4090–4092.

Schneider, Richard C., "Sequence (Viterbi–Equivalent) Decoding", *IEEE Transactions on Magnetics,* vol. 24, No. 6, Nov. 1988, pp. 2539–2541.

Hilden, et al., "Shift Error Correcting Modulation Codes", *IEEE Transactions on Magnetics,* vol. 27, No. 6, Nov. 1991, pp. 4600–4605.

Moon, Jackyun, "Signal–to–Noise Ratio Degradation with Channel Mismatch", *IEEE Transactions on Magnetics,* vol. 27, No. 6, Nov. 1991, pp. 4837–4839.

Thapar, et al., "Spectral Shaping for Peak Detection Equalization", *IEEE Transactions on Magnetics* vol. 26, No. 5, Sep. 1990, pp. 2309–2311.

Abend, et al., "Statistical Detection for Communication Channels with Intersymbol Interference", *Proceedings of the IEEE,* vol. 58, No. 5, May 1970, pp. 779–785.

Beare, C.T., "The Choice of the Desired Impulse Response in Combined Linear–Viterbi Algorithm Equalizers", *IEEE Transactions On Communications,* vol. COM–26, No. 8, Aug. 1978, pp. 1301–1307.

Forney, G. David, "The Viterbi Algorithm", *Proceedings of IEEE,* vol. 61, No. 3, Mar. 1973, pp. 268–278.

Tsang, et al., "Time–Domain Study of Proximity–Effect Induced Transition Shifts", *IEEE Transactions on Magnetics,* vol. 27, No. 2, Mar. 1991, pp. 795–802.

Wood, et al., "Viterbi Detection of Class IV Partial Response on a Magnetic Recording Channel", *IEEE Transactions on Communications,* vol. COM–34, No. 5, May 1986, pp. 454–461.

Frederickson, Lyle J., "Viterbi Detection of Matched Spectral Null Codes for PR4 Systems", *IEEE Transactions on Magnetics,* vol. 28, No. 5, Sep. 1992, pp. 2889–2891.

Hermann, R., "Volterra Modeling of Digital Magnetic Saturation Recording Channels", *IEEE Transactions on Magnetics,* vol. 26, No. 5, Sep. 1990, pp. 2125–2127.

Schneider, Richard C., "Write Equalization for Generalized (d,k) Codes", *IEEE Transactions on Magnetics,* vol. 24, No. 6, Nov. 1988, pp. 2533–2535.

DATA SYNCHRONIZATION METHOD AND CIRCUIT USING A TIMEOUT COUNTER

This application is provisional application of Ser. No. 60/014,858 filed on Apr. 4, 1996.

TECHNICAL FIELD OF THE INVENTION

This invention relates generally to the field of information storage and more particularly to a data synchronization method and circuit using a timeout counter.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space. An axiom in the computer industry is that there is no such thing as enough memory and disk storage space.

To meet these ever increasing demands, hard disk drives continue to evolve and advance. Some of the early disk drives had a maximum storage capacity of five megabytes and used fourteen inch platters, whereas today's hard disk drives are commonly over one gigabyte and use 3.5 inch platters. Correspondingly, advances in the amount of data stored per unit of area, or areal density, have dramatically accelerated. For example, in the 1980's, areal density increased about thirty percent per year while in the 1990's annual areal density increases have been around sixty percent. The cost per megabyte of a hard disk drive is inversely related to its areal density.

Mass storage device manufacturers strive to produce high speed hard disk drives with large data capacities at lower and lower costs. A high speed hard disk drive is one that can store and retrieve data at a fast rate. One aspect of increasing disk drive speed and capacity is to improve or increase the areal density. Areal density may be increased by improving the method of storing and retrieving data.

In general, mass storage devices, such as hard disk drives, include a magnetic storage media, such as rotating disks or platters, a spindle motor, read/write heads, an actuator, a pre-amplifier, a read channel, a write channel, a servo controller, and control circuitry to control the operation of the hard disk drive and to properly interface the hard disk drive to a host or system bus. The read channel, write channel, servo controller, and memory may all be implemented as one integrated circuit that is referred to as a data channel. The control circuitry often includes a microprocessor for executing control programs or instructions during the operation of the hard disk drive.

A hard disk drive (HDD) performs write and read operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The control circuitry moves the read/write heads to the appropriate track and locates the appropriate sector of the track. Finally, the HDD control circuitry transfers the data from the DRAM to the located sector of the disk platter through the write channel. The write channel may encode the data so that the data can be more reliably retrieved later. A sector generally has a fixed data storage capacity, such as 512 bytes of user data per sector.

In a read operation, the appropriate sector to be read is located and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM of the control circuitry. The processor then communicates to the host that data is ready to be transferred.

As the disk platters are moving, the read/write heads must align or stay on a particular track. This is accomplished by reading information from the disk called a servo wedge. Generally, each sector has a corresponding servo wedge. The servo wedge indicates the position of the heads. The data channel receives this position information so the servo controller can continue to properly position the heads on the track.

Traditional HDD read channels used a technique known as peak detection for extracting or detecting digital information from the analog information stored on the magnetic media. In this technique, the waveform is level detected and if the waveform level is above a threshold during a sampling window, the data is considered a "one." More recently, advanced techniques utilizing discrete time signal processing (DTSP) to reconstruct the original data written to the disk are being used in read channel electronics to improve areal density. In these techniques, the data is synchronously sampled using a data recovery clock. The sample is then processed through a series of mathematical manipulations using signal processing theory.

There are several types of synchronously sampled data (SSD) channels. Partial response, maximum likelihood (PRML); extended PRML (EPRML); enhanced, extended PRML (EEPRML); fixed delay tree search (FDTS); and decision feedback equalization (DFE) are several examples of different types of SSD channels using DTSP techniques. The maximum likelihood detection performed in several of these systems is usually performed by a Viterbi decoder implementing the Viterbi algorithm, named after Andrew Viterbi who developed it in 1967.

The SSD channel or read channel generally requires mixed-mode circuitry for performing a read operation. The circuitry may perform such functions as analog signal amplification, automatic gain control (AGC), continuous time filtering, signal sampling, DTSP manipulation, timing recovery, signal detection, and formatting. In all SSD channels, the major goal during a read operation is to accurately retrieve the data with the lowest bit error rate (BER) in the highest noise environment. The data channel circuitry, including both a read channel and a write channel, may be implemented on a single integrated circuit package that contains various input and output (I/O) pins.

When a read operation occurs in the read channel of an SSD channel and user data is to be read from a sector, the read channel must be initialized in preparation for receiving user data from the sector. The read channel is initialized by reading initialization information that is provided before the user data for each sector. This initialization information may be referred to as header information. The header information may provide a gain and timing recovery signal used by the read channel.

After the read channel is initialized, a synchronization byte or synchronization field detection circuitry of the read channel searches for a synchronization field or known reference value indicating that sector data will follow. Due to detection errors or timing errors, the actual synchronization field may go undetected. If the synchronization field goes undetected, the search for the synchronization field continues over the entire sector where user data is stored. This futile synchronization field search may continue over an entire 4,096 bit sector resulting in reduced HDD performance by increasing processing overhead. Another problem resulting from the non-detection of the synchronization field is the possibility that a false synchronization field detection will occur. This may result in data errors that cannot be corrected. However, the error correction circuitry may attempt to correct these errors resulting in increased processing overhead which further deteriorates HDD performance. Thus, HDD speed and performance suffers when data synchronization methods and circuits used to search for a synchronization field fail to detect a synchronization field yet continue searching for a synchronization field over an entire sector.

SUMMARY OF THE INVENTION

From the foregoing it may be appreciated that a need has arisen for an improved data synchronization method and circuit. In accordance with the present invention, a data synchronization method and circuit for synchronizing data in a read channel of a mass storage system is provided which substantially eliminates and reduces the disadvantages and problems of previously developed methods and circuits for synchronizing data. The present invention searches for the presence of a synchronization field over a predefined period of time which prevents wasted synchronization field searches over an entire sector and reduces the possibilities of data errors caused by the false detection of synchronization fields.

According to the present invention, a data synchronization circuit is provided. The data synchronization circuit includes a synchronization timeout counter and a compare circuit. The synchronization timeout counter provides a synchronization timeout counter signal in an enabled state for a predefined synchronization period. The compare circuit compares a digital read signal to a known reference, such as a synchronization field or byte, during the predefined synchronization period when the synchronization timeout counter signal is enabled. The compare circuit enables a synchronization detect signal if the digital read signal is equivalent to the known reference.

The present invention provides various technical advantages over previously developed data synchronization methods and circuits used in the read channel of a mass storage system. For example, a technical advantage of the present invention includes the ability to prevent the futile search for a synchronization field or synchronization signal over an entire sector. Whenever the search does not result in the detection of the synchronization field after a predefined "window" or period of time, the search ends. This improves overall HDD performance by reducing processing overhead. Another technical advantage includes the reduction of false synchronization field detections that may occur when an entire sector is searched. This also reduces processing overhead. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
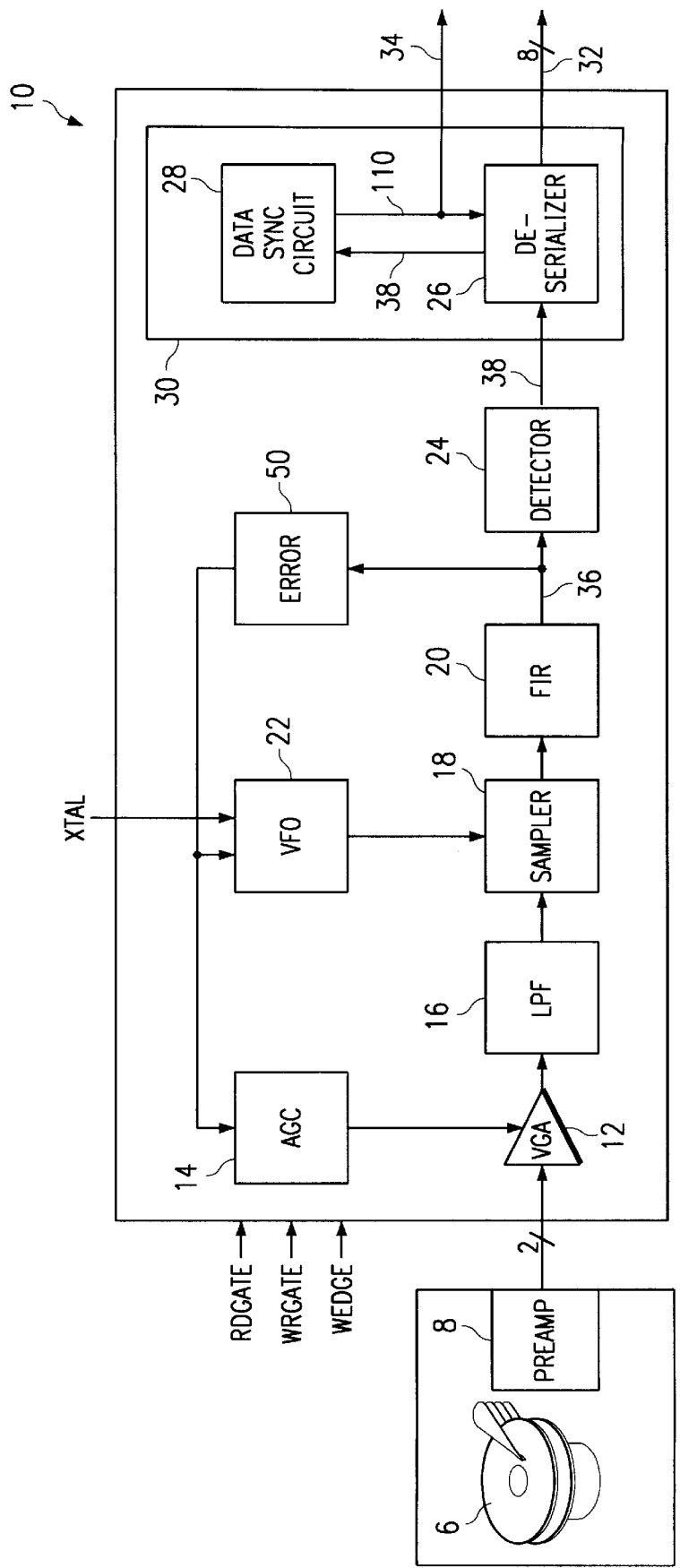
FIG. 1 is a block diagram illustrating a read channel of a mass storage system.

FIG. 1 is a block diagram of a read channel 10 of a hard disk drive (HDD). Read channel 10 includes a variety of circuit modules used to process and condition an analog read signal received from a preamplifier 8 and a disk/head assembly 6 during a read operation. The circuit modules of read channel 10 include a variable gain amplifier (VGA) 12, an automatic gain control circuit (AGC) 14, a low pass filter (LPF) 16, a sampler 18, a finite impulse response filter (FIR) 20, an error circuit 50, a detector 24, a data synchronization circuit 28, a deserializer 26, and a variable frequency oscillator (VFO) 22. The combination or subcombination of all of these circuit modules may be referred to as a read channel processing circuit.

These circuit modules of read channel 10 are used during a read operation to perform various functions to condition the analog read data signal received at VGA 12 to produce a corresponding digital read signal that is provided at a parallel data path 32. The digital data is then supplied to control circuitry of the hard disk drive and ultimately to a host system. The control circuitry and host system are not shown in FIG. 1. Data synchronization circuit 28 provides a synchronization detect signal 110 through a synchronization detect path 34 when a synchronization field is detected indicating that user data will be provided next during the read operation.

VGA 12 receives the analog read signal from disk/head assembly 6 through preamplifier 8. VGA 12 amplifies the analog read signal and provides an amplified analog signal at its output. VGA 12 and AGC 14 work together to provide the amplified analog signal. The amount of amplification or gain provided by VGA 12 is controlled by AGC 14. AGC 14L receives a feedback signal or error signal from error circuit 50 that is used to determine a gain signal that is provided to VGA 12. The gain signal establishes the appropriate gain supplied by VGA 12 to the analog read signal. VGA 12 may be a differential analog amplifier with variable gain.

LPF 16 receives the amplified analog signal from VGA 12 and removes unwanted high frequency noise. LPF 16 provides wave form shaping and additional amplitude boost to the amplified analog signal and provides a filtered output signal. LPF 16 may be a continuous time 7th order filter designed using Gm/C components that may be operated in a data mode or a servo mode. The cutoff frequency and boost of LPF 16 may be programmable.

Sampler 18 samples the filtered output signal from LPF 16 and provides a discrete analog output signal having discrete values. Sampler 18 converts the filtered output signal from continuous time to discrete time. The filtered output signal is sampled synchronously at times that correspond to the various magnetic transitions stored on disk/head assembly 6. These magnetic transitions correspond to the data stored on disk/head assembly 6. Sampler 18 samples the signal and holds the value until the next sample occurs.

VFO 22 controls when the samples occur in sampler 18 by providing a sample clock signal to sampler 18 indicating when sampler 18 should sample and hold the filtered output signal. Each discrete value of the discrete analog output signal corresponds to the value or amplitude of the filtered output signal at the time the signal was sampled by sampler 18. Sampler 18 may be a sample and hold circuit such as a circular sample and hold circuit that is time sequence multiplexed to FIR 20 so that the correct time sequenced value is presented to FIR 20.

FIR 20 receives the discrete analog output signal from sampler 18 and provides an output signal. FIR 20 equalizes the discrete analog output signal and provides an equalized read signal 36 having discrete levels corresponding to the magnetic transitions on the disk/head assembly 6. FIR 20 equalizes the signal by receiving a plurality of filter coefficients or taps and uses them in filtering or equalizing the signal. The discrete analog output signal is equalized to the target function of detector 24.

FIR 20 includes a plurality of multipliers. Each multiplier receives one of the plurality of filter coefficients and a consecutive discrete value of the discrete analog output signal provided by sampler 18. The outputs of each of the multipliers are then provided as inputs to an adder, such as an analog summer, which sums the inputs and provides equalized read signal 36. As the discrete analog output signal changes, the consecutive discrete values of the discrete analog output signal that are provided to each multiplier are shifted to the next multiplier such that a new discrete value is now provided to the first multiplier and the oldest discrete value is dropped from the last multiplier.

FIR 20 may be an analog finite response filter having five tap filter with coefficients set by programmable digital circuitry. FIR 20 may receive five digital coefficients or filter tap weights that are converted to an analog value through a digital-to-analog converter. Each coefficient is then provided to a separate multiplier. The outputs of all five of the multipliers are provided to an analog summer to provide equalized read signal 36. Although five coefficients or taps are described, the number of coefficients or taps and the corresponding number of multipliers may vary.

Detector 24 receives equalized read signal 36 from FIR 20. Detector 24 analyzes the signal to produce a digital read signal 38 corresponding to the data stored on disk/head assembly 6. In one embodiment, detector 24 may be a maximum likelihood detector or Viterbi decoder implementing the Viterbi algorithm. Assuming that detector 24 is implemented as a Viterbi decoder, detector 24 includes a metric, and a trellis for analyzing the signal. The metric receives equalized read signal 36 from FIR 20 and performs an add, compare, and select function to determine the distance between magnetic transitions on the disk. The output of the metric is provided to the trellis which acts as a decision tree for sequence decoding. The trellis provides digital read signal 38 which serves as the output of detector 24.

Error circuit 50 provides an error signal based upon receiving equalized read signal 36 from FIR 20. The error signal serves as an input to VFO 22 and AGC 14. The error signal indicates how far the discrete values of equalized read signal 36 differ from an ideal target value. Error circuit 50 includes comparators or equivalent circuitry to compare the discrete values of equalized read signal 36 to various ideal target values.

VFO 22 receives the error signal from error circuit 50 and a reference clock signal and provides a clock signal to, control the sample time of sampler 18. During a read operation, VFO 22 receives the error signal and adjusts the frequency of its output clock signal an amount corresponding to the error signal. VFO 22, sampler 18, FIR 20, and error circuit 50 together provide a sampled time phase locked loop function to read channel 10.

Deserializer 26 receives digital read signal 38 in serial format from detector 24 and a synchronization detect signal 110 from data synchronization circuit 28. Digital read signal 38 is also provided to data synchronization circuit 28. Deserializer 26 places digital read signal 38 in parallel format and provides the signal to external control circuitry through parallel data path 32 when synchronization detect signal 110 is enabled. The parallel format may be any parallel format such as an eight-bit or nine-bit format.

Figure 2:
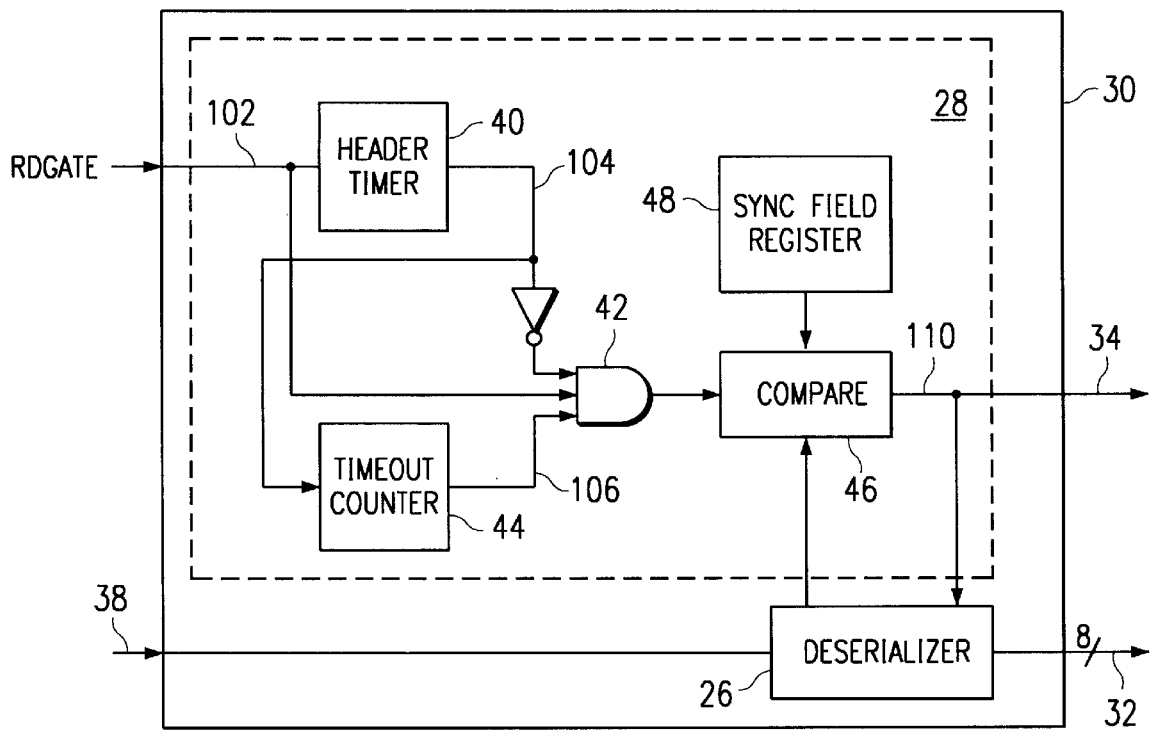
FIG. 2 is a block diagram illustrating a data synchronization circuit and deserializer of the read channel.

Data synchronization circuit 28, described more fully in FIG. 2, receives digital read signal 38 from deserializer 26 and provides synchronization detect signal 110. Synchronization detect signal 110 is enabled if a synchronization field is detected in digital read signal 38. Synchronization detect signal 110 is provided to deserializer 26 and to external control circuitry through a synchronization detect path 34. During a read operation, data synchronization circuit 28 searches for the presence of a synchronization field within digital read signal 38. The synchronization field indicates that user data for the sector will be provided next. The search continues for a predefined period of time. Data synchronization circuit 28 uses timers and compare circuits to determine if the synchronization field is present in digital read signal 38.

In operation, read channel 10 receives an analog read signal from disk/head assembly 6 through preamplifier 8 when the RDGATE signal is enabled. The enabling of the RDGATE signal indicates that a read operation is to be performed in read channel 10. The gain and timing recovery of read channel 10 must first be initialized in preparation for receiving user data from a sector of a disk of disk/head assembly 6. A header is initially provided by the analog read signal that contains a gain and timing recovery signal. VGA 12 receives the analog read signal and provides the signal throughout read channel 10 to establish the gain and timing recovery. After the header has been provided and the gain and timing recovery established, a synchronization field is provided by the analog read signal that indicates that user data will be received next. Data synchronization circuit 28 searches for the presence of the synchronization field for a predefined period or "window" of time. Once data synchronization circuit 28 detects the synchronization field and a synchronization field is provided, user data may be processed by read channel 10. The read operation is described in more detail in the following paragraphs.

VGA 12 receives the analog read signal, containing user data, and provides appropriate gain or boost to the analog data signal which is then filtered by LPF 16. AGC 14 provides a gain signal to VGA 12 to establish the appropriate amplification or gain needed by read channel 10. AGC 14 receives an error signal from error circuit 50 that is used to generate the gain signal provided to VGA 12. LPF 16 removes undesired high frequency noise and provides additional amplitude boost to the amplified analog signal.

Sampler 18, under the control of VFO 22, receives the filtered output signal from LPF 16 and samples the signal. Sampler 18 provides a discrete analog output signal having discrete values. FIR 20 equalizes the discrete analog output signal and provides equalized read signal 36 having discrete levels. Error circuit 50 receives equalized read signal 36 and provides an error signal to VFO 22 so that VFO 22 can provide an appropriate clock signal to sampler 18. Detector 24 also receives equalized read signal 36 from FIR 20 and analyzes the signal to provide digital read signal 38. Digital read signal 38 is provided to deserializer 26 which places digital read signal 38 into parallel format and provides the signal to parallel data path 32 after receiving synchronization detect signal 110 from data synchronization circuit 28.

FIG. 2 is a block diagram of data synchronization circuit/deserializer 30 of read channel 10. Data synchronization circuit/deserializer 30 includes deserializer 26 and data synchronization circuit 28. Data synchronization circuit 28 includes a header timer 40, a timeout counter 44, a compare enable circuit 42, a compare circuit 46, and a synchronization field register 48. Data synchronization circuit/deserializer 30 receives digital read signal 38 and read gate signal 102 indicating that a read operation is to be performed. Deserializer 26 receives digital read signal 38 and provides the signal to data synchronization circuit 28. Data synchronization circuit 28 analyzes digital read signal 38 for a predefined period or "window" of time to determine if a synchronization field is present.

Header timer 40 receives read gate signal 102 and provides a header timer signal 104. When read gate signal 102 is enabled indicating that a read operation is to take place, header timer 40 enables header timer signal 104 for a predefined period of time. The predefined period of time that header timer 40 enables header timer signal 104 corresponds to the estimated time that it takes digital read signal 38 to provide header information at the beginning of a read operation. Header timer 40 may be any of a variety of timers such as a programmable timer.

Timeout counter 44 receives header timer signal 104 and provides timeout counter signal 106. Timeout counter 44 enables timeout counter signal 106 for a predefined period of time in response to receiving header timer signal 104. The predefined period of time that timeout counter 44 enables timeout counter signal 106 corresponds to the estimated period or "window" of time that digital read signal 38 will supply a synchronization field during a read operation. Timeout counter 44 may be any of a variety of programmable timers.

Compare enable circuit 42 receives read gate signal 102, timeout counter signal 106, and an inverted header timer signal 104. Compare enable circuit 42 enables a compare enable signal when all of its inputs are true or are enabled. Compare enable circuit 42 may be any of a variety of digital logic circuits such as a three input AND gate.

Compare circuit 46 receives the compare enable signal and provides synchronization detect signal 110 to deserializer 26 and to external circuitry through synchronization detect path 34. Compare circuit 46 compares digital read signal 38, provided from deserializer 26, to the contents of synchronization field register 48 when the compare enable signal provided from compare enable circuit 42 is enabled. Synchronization field register 48 has been preloaded with a synchronization filed or byte value. Synchronization field register 48 may be any of a variety of memory storage registers such as a programmable or fixed memory register. If the comparison of digital read signal 38 and the contents of synchronization field register 48 results in a match, synchronization detect signal 110 is enabled indicating that the synchronization field has been located and that digital read signal 38 will now provide user data. Compare circuit 46 may include any of a variety of circuits, such as a series of AND gates used for comparing the individual bits of the synchronization field value stored in synchronization field register 48 with the bits provided by digital read signal. 38.

Deserializer 26 receives digital read signal 38 and provides digital read signal 38 to compare circuit 46. Deserializer 26 also receives synchronization detect signal 110 from compare circuit 46. Deserializer 26 places digital read signal 38 in parallel format and provides digital read signal 38 to parallel data path 32 with proper synchronization as indicated by synchronization detect signal 110 which is provided by compare circuit 46.

In operation, data synchronization circuit/deserializer 30 receives read gate signal 102 in an enabled state that indicates a read operation is to be performed. Data synchronization circuit/deserializer 30 also receives digital read signal 38 from detector 24 as shown in FIG. 1. In response to receiving read gate signal 102 in an enabled state, header timer 40 enables header timer signal 104 for a period of time. During this period of time, digital read signal 38 provides signals corresponding to sector header information that are used to initialize read channel 10. After the period of time, header timer 40 transitions header timer signal 104 from an enabled state to an unenabled state.

Timeout counter 44 receives header timer signal 104 and enables timeout counter signal 106 for a period or "window" of time in response to header timer signal 104 transitioning from an enabled state to an unenabled state. During this period of time, digital read signal 38 should provide the synchronization field for the sector of disk/head assembly 6 that is being read.

Compare enable circuit 42 enables compare circuit 46 during this window of time when read gate signal 102 is enabled, header timer signal 104 is not enabled, and timeout counter signal 106 is enabled. Compare circuit 46 receives the serial digital data stream of digital read signal 38 from deserializer 26 and compares the value stored in synchronization field register 48 to digital read signal 38. The value stored in synchronization field register 48 is the synchronization field. Once the synchronization field is found within digital read signal 38, compare circuit 46 enables synchronization detect signal 110 to indicate that the synchronization field has been located. If the synchronization field is not located when the conditions described at the first of this paragraph are true, synchronization detect signal 110 is not enabled. Deserializer 26 places digital read signal 38 in parallel format and provides user data to external circuitry through parallel data path 32 synchronized in response to receiving synchronization detect signal 110 in the enabled state.

Figure 3:
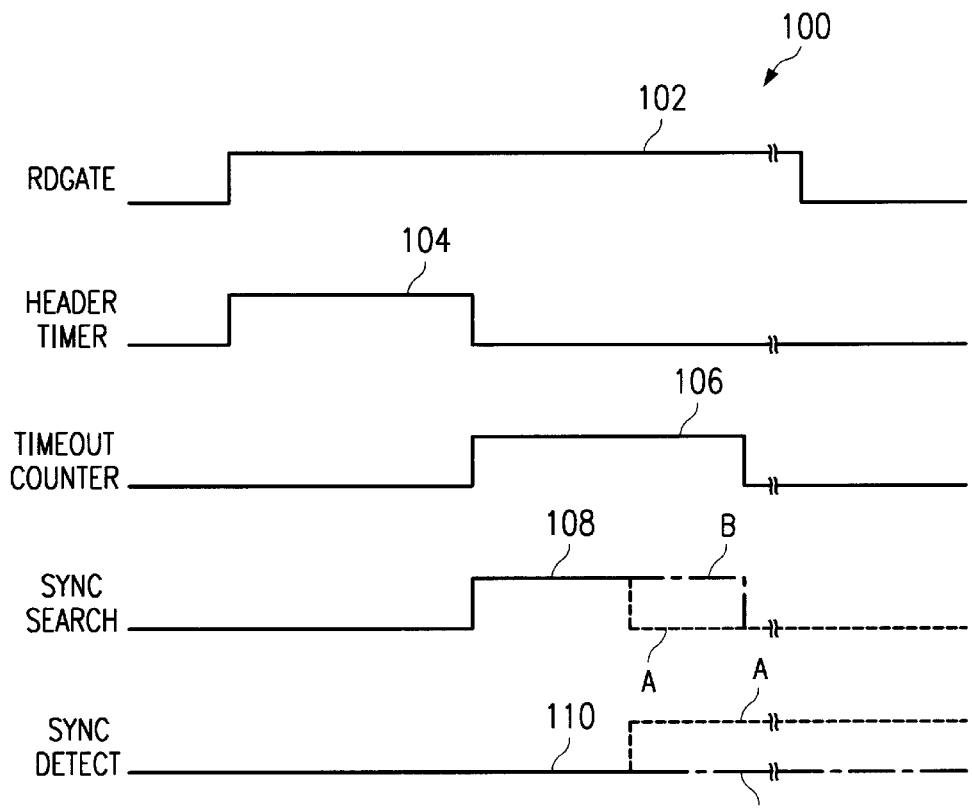
FIG. 3 is a data synchronization timing diagram of the data synchronization circuit and deserializer.

FIG. 3 is a data synchronization timing diagram 100 illustrating the timing of data synchronization circuit/deserializer 30. Data synchronization timing diagram 100 includes read gate signal 102, header timer signal 104, timeout counter signal 106, synchronization search signal 108, and synchronization detect signal 110.

During a read operation, read gate signal 102 transitions from a low or non-enabled state to a high or enabled state, indicating that a read operation will be performed. Header timer signal 104 transitions to an enabled state for a period of time in response to read gate signal 102 transitioning from a low to a high state. The period of time that header timer signal 104 is enabled corresponds to the length of time in which header information will be supplied to read channel 10.

Timeout counter signal 106 transitions to an enabled state for a period of time when header timer signal 104 transitions from a high state to a low state. The period of time that timeout counter signal 106 is enabled corresponds to the estimated period or window of time, in which a synchronization field should be provided by digital read signal 38.

Synchronization search signal 108 is enabled when read gate signal 102 is enabled, header timer signal 104 is not enabled, and timeout counter signal 106 is enabled. During this condition, a search for the synchronization field may proceed. Synchronization search signal 108 may be provided by compare enable circuit 42 as shown in FIG. 2. If the synchronization field is detected, synchronization search signal 108 transitions from a high state to a low state as illustrated by 108A. If the synchronization field is not detected during the available window of time, synchronization search signal 108 transitions from a high state to a low state, as illustrated by 108B.

Synchronization detect signal 110 is enabled when the synchronization field is detected while synchronization search signal 108 is enabled. For example, when the synchronization field is located, synchronization detect signal 110 transitions from a low state to a high state as indicated by 110A. If a synchronization field is not detected while synchronization search signal 108 is enabled, synchronization detect signal 110 remains non-enabled or in a low state, as illustrated by 110B.

Thus, it is apparent that there has been provided, in accordance with the present invention, a data synchronization method and circuit using a timeout counter that satisfies the advantages set forth above. For example, an unnecessary search for a synchronization field over an entire sector of user data is eliminated. This also prevents the possibility of an erroneous synchronization field detection during this unnecessary search. Overall HDD performance is improved by eliminating unnecessary searches for a synchronization field. Although the preferred embodiment has been described in detail, it should be understood that various changes, substitutions, and alterations can be made herein. For example, a variety of circuit techniques could be used to condition an analog read signal and to provide a digital read signal. Also, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention. While the invention has been particularly shown and described by the foregoing detailed description, it will be understood by those skilled in the art that various other changes in form and detail may be made without departing from the spirit and scope of the invention as defined by the following claims.

What is claimed is:

1. A data synchronization circuit comprising:
  a synchronization timeout counter operable to provide a synchronization timeout counter signal, the synchronization timeout counter signal operable to provide the synchronization timeout counter signal in an enabled state during a predefined synchronization period;
  a compare circuit operable to receive a digital read signal and to compare the digital read signal to a known reference during the predefined synchronization period, the compare circuit operable to generate a synchronization detect signal in said enabled state if the digital read signal is found to be equivalent to the known reference during the predefined synchronization period; and
  a header timer circuit operable to generate a header timer signal in said enabled state during a predefined header period in response to receiving a read enable signal, the synchronization timeout counter operable to receive the header timer signal and to provide the synchronization timeout counter signal in said enabled state after the expiration of the predefined header period.

2. The data synchronization circuit of claim 1 further comprising:
  a compare enable circuit for enabling the compare circuit, the compare enable circuit operable to receive the header timer signal, the synchronization timeout counter signal, and the read enable signal, the compare enable circuit further operable to enable the compare circuit after the predefined header period, during the predefined synchronization period, and when the read enable signal is enabled.

3. The data synchronization circuit of claim 2 wherein the compare enable circuit is an AND gate.

4. The data synchronization circuit of claim 1 wherein the predefined header period corresponds to an estimated time needed to receive header information front the digital read signal during a read operation.

5. The data synchronization circuit of claim 1 wherein the predefined header period and the predefined synchronization period are programmable.

6. A data synchronization circuit comprising:
  a synchronization timeout counter operable to provide a synchronization timeout counter signal, the synchronization timeout counter signal operable to provide the synchronization timeout counter signal in an enabled state during a predefined synchronization period;
  a compare circuit operable to receive a digital read signal and to compare the digital read signal to a known reference during the predefined synchronization period, the compare circuit operable to generate a synchronization detect signal in said enabled state if the digital read signal is found to be equivalent to the known reference during the predefined synchronization period; and
  a deserializer operable to receive the synchronization detect signal from the compare circuit and the digital read signal, the deserializer operable to provide the digital read signal in parallel format when the synchronization detect signal is enabled.

7. A read channel including a data synchronization circuit comprising:
  a read channel processing circuit having a plurality of circuit modules, the plurality of circuit modules operable to receive and process an analog read signal, the plurality of circuit modules operable to generate a digital read signal in response; and
  a data synchronization circuit operable to generate a header timer signal in an enabled state during a first predefined period and to generate a synchronization timeout counter signal in said enabled state during a second predefined period, the second predefined period occurring after the expiration of the first predefined period, the data synchronization circuit operable to compare the digital read signal to a known reference during the second predefined period and to enable a synchronization detect signal if the digital read signal is equivalent to the known reference.

8. The read channel of claim 7 wherein the plurality of circuit modules of the read channel processing circuit comprises:

an automatic gain control circuit operable receive an analog read signal and an error signal, the automatic gain control circuit operable to amplify the analog read signal to generate an amplified data signal in response;

a filter circuit operable to receive the amplified data signal from the automatic gain control circuit and to filter and equalize the amplified data signal to provide a filtered/equalized data signal;

an error circuit operable to receive the filtered/equalized data signal and to generate and provide the error signal to the automatic gain control circuit; and a detector operable to receive and decode the filtered/equalized data signal and to provide a digital read signal to the data synchronization circuit in response.

9. The read channel of claim 7 wherein the data synchronization circuit generates the header timer signal in the enabled state in response to receiving a read enable signal that indicates a read operation is to take place in the read channel.

10. A method for synchronizing data in a read channel of a mass storage system, the method comprising the steps of:

receiving a read enable signal;

starting a timer in response to receiving the read enable signal;

stopping the timer after a period of time;

starting a timeout counter in response to stopping the timer; and searching for a synchronization field in response to starting the timeout counter.

11. The method of claim 10 further comprising the steps of:

stopping the timeout counter after a period of time; and stopping the search for a synchronization field after the stopping the timeout counter step.

12. The method of claim 11 wherein the stopping the timeout counter step includes stopping the timeout counter after a programmable period of time.

13. The method of claim 10 further comprising the steps of:

detecting the synchronization field; and enabling a synchronization detect signal that is provided to a deserializer.

14. The method of claim 13 further comprising the step of stopping the search for a synchronization field after the detecting a synchronization field step.

15. The method of claim 10 wherein the starting a timer step includes using a header timer.

16. The method of claim 10 wherein the synchronization field is a synchronization byte.

* * * * *